United States Patent
Hosaka et al.

(10) Patent No.: US 8,445,139 B2
(45) Date of Patent: May 21, 2013

(54) BIPOLAR ELECTRODE BATTERIES AND METHODS OF MANUFACTURING BIPOLAR ELECTRODE BATTERIES

(75) Inventors: Kenji Hosaka, Yokosuka (JP); Osamu Shimamura, Kohnan-ku (JP); Hideaki Horie, Yokosuka (JP); Takamitsu Saito, Kanazawa-ku (JP); Takuya Kinoshita, Yokosuka (JP); Takaaki Abe, Isogo-ku (JP); Naoto Kiriu, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 986 days.

(21) Appl. No.: 10/574,038

(22) PCT Filed: Dec. 7, 2005

(86) PCT No.: PCT/IB2005/003695
§ 371 (c)(1),
(2), (4) Date: Mar. 27, 2006

(87) PCT Pub. No.: WO2006/061696
PCT Pub. Date: Jun. 15, 2006

(65) Prior Publication Data
US 2008/0220330 A1    Sep. 11, 2008

(30) Foreign Application Priority Data

Dec. 7, 2004  (JP) ................... 2004-354526
Oct. 28, 2005 (JP) ................... 2005-315147

(51) Int. Cl.
*H01M 4/66*   (2006.01)
*H01M 6/14*   (2006.01)
*H01M 4/13*   (2010.01)

(52) U.S. Cl.
USPC ........... 429/245; 429/233; 429/210; 429/209; 429/304; 29/623.1; 29/623.5

(58) Field of Classification Search
USPC ......... 429/209, 210, 233, 245, 304; 29/623.1, 29/623.5
See application file for complete search history.

(56) References Cited

U.S. PATENT DOCUMENTS 6,103,413 A * 8/2000 Hinton et al. ................... 429/32
6,280,873 B1   8/2001 Tsukamoto
(Continued)

FOREIGN PATENT DOCUMENTS

JP    2000-195523    7/2000
JP    2004-095400    3/2004
(Continued)

OTHER PUBLICATIONS

"What is PET?". KenPlas Industry Limited. Accessed on: Feb. 12, 2010. <www.kenplas.com/project/pet/>.*
(Continued)

*Primary Examiner* — Edu E Enin-Okut
(74) *Attorney, Agent, or Firm* — Young Basile

(57) ABSTRACT

The disclosure relates to bipolar cells including electrodes surrounding a collector. Embodiments of the bipolar cells include a collector containing a high-polymer material. The disclosure also relates to bipolar electrode batteries containing bipolar cells including a collector body containing electrically conductive high-polymer or electrically conductive particles distributed in a high-polymer. By adding such high molecular weight polymer material to the collector, the weight of the collector may be reduced and the output power density per weight of the battery may be improved. The disclosure further relates to methods of forming collecting bodies and electrodes for bipolar cells using an inkjet printing method. Bipolar cells according to the present invention may be used to fabricate batteries such as lithium ion batteries, which may be connected to form battery modules used, for example, to provide electrical power for a motor vehicle.

10 Claims, 5 Drawing Sheets

U.S. PATENT DOCUMENTS

| | | |
|---|---|---|
| 6,656,232 B1 * | 12/2003 | Usui et al. .................... 29/623.1 |
| 6,664,006 B1 * | 12/2003 | Munshi .......................... 429/305 |
| 2003/0026063 A1 | 2/2003 | Munshi |
| 2004/0001998 A1 * | 1/2004 | Hopkins et al. ............... 429/124 |
| 2004/0126655 A1 | 7/2004 | Hisamitsu et al. |
| 2005/0084760 A1 * | 4/2005 | Hwang et al. ................. 429/234 |

FOREIGN PATENT DOCUMENTS

| | | |
|---|---|---|
| JP | 2004-146348 | 5/2004 |
| JP | 2004-164897 | 6/2004 |
| JP | 2004179053 A * | 6/2004 |
| WO | WO 00/10736 | 3/2000 |
| WO | WO 03/009920 | 2/2003 |

OTHER PUBLICATIONS

Notification of Transmittal of the International Search Report and the Written Opinion of the International Searching Authority for corresponding International Application No. PCT/IB2005/003695, dated Jun. 12, 2006, 12 pages.

* cited by examiner

BIPOLAR ELECTRODE BATTERIES AND METHODS OF MANUFACTURING BIPOLAR ELECTRODE BATTERIES

This application is a National Stage filing under 35 USC 371 of International Application No. PCT/IB2005/003695, filed Dec. 7, 2005, which claims priority to Japanese Patent Application No. 2005-315147, filed Oct. 28, 2005, and Japanese Patent Application No. 2004-354526, filed Dec. 7, 2004, the entire contents of each of which is incorporated herein by reference.

TECHNICAL FIELD

The invention relates to electric power storage systems, particularly bipolar electrode storage batteries.

BACKGROUND

Recently, in order to protect the environment, a decrease in the global emissions of carbon dioxide has been sought. In the automobile industry, there is an active effort to decrease carbon dioxide emissions from internal combustion engines by introduction of electric vehicles (EV) and hybrid electric vehicles (HEV) powered by electric motors. This has led to recent progress in the development of lightweight and lower cost secondary storage batteries for powering electric motors.

Although some secondary storage batteries (e.g. lithium ion batteries) can achieve high energy density and high output power density, it is generally necessary to serially connect multiple batteries in order to obtain a sufficiently large output power to power an electric motor vehicle. However, when batteries are serially connected through an external electrical connection (e.g. external wiring), the output power is decreased due to the electrical resistance of the external electrical connection. Furthermore, batteries having an external electrical connection are spatially disadvantageous. In other words, due to the length of the external electrical connection, the output power density and energy density of the batteries are decreased, and the overall operating efficiency of the electric vehicle is reduced due to the weight of the external electrical connection.

To solve this problem, bipolar cells have been developed in which a positive electrode (i.e. cathode type) active material and a negative electrode (i.e. anode type) active material are placed on opposites sides of a collector (see, for example, Japanese published unexamined patent application No. 2004-95400). Multiple bipolar cells may be electrically connected internally to form a secondary storage battery module (i.e. a bipolar electrode battery). Such bipolar electrode batteries are known to exhibit good electrical performance characteristics and desirable physical properties, such as low weight to volume ratio, thin cross-section, and good heat dissipation rate during operation and charging.

Because of the rapid adoption of the bipolar electrode battery by the automotive industry, it has been possible to improve the output power density and energy density of batteries for motor vehicles. However, additional improvement of bipolar cell battery performance is continually sought.

SUMMARY

In general, the invention relates to bipolar cells. For example, one embodiment of a bipolar cell described herein includes electrodes made of a collector, a positive electrode electrically connected to one side of the collector, a negative electrode electrically connected to an opposing side of the collector; and electrolyte layers placed between the electrodes. In certain embodiments, the collector contains a high-polymer material.

In additional embodiments, bipolar cells according to the present invention may be used to fabricate secondary storage batteries such as lithium ion batteries. The batteries may be used to provide electrical power for a motor vehicle, in particular, to provide power to electric motors used to power motor vehicles. In particular, bipolar cells according to the present invention may be connected together to form a battery, which may be further connected together to form a battery module used, for example, as a power source for motor vehicles.

Other embodiments of the invention provide methods of manufacturing bipolar cells that may include forming collectors by depositing collector ink that contains polymer material using an ink jet printing method. As one example, a method of manufacturing bipolar cells comprises forming a collector by depositing on a surface a collector ink which contains high polymer material using an ink jet printing method, and forming a cathode by depositing on a surface a cathode ink which contains cathode type active materials using an ink jet printing method. The method further comprises forming an anode by depositing on a surface an anode ink which contains anode type active materials using an ink jet printing method.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the present invention provide a bipolar electrode battery comprising electrodes made of a collector, a cathode (positive electrode) which is electrically connected to one side of the collector, an anode (negative electrode) which is electrically connected to the other side of the collector; and electrolyte layers surrounding the cathode and anodes. As described in further detail below, embodiments of the bipolar electrode battery may include a collecting body containing a high-polymer material.

Figure 1:
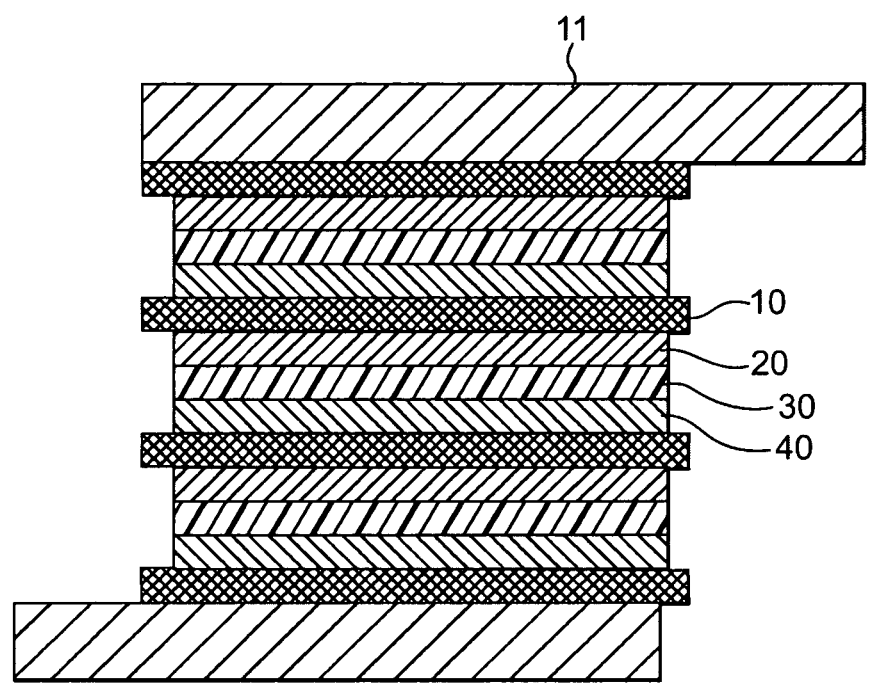
FIG. 1 is a cross-sectional side view diagram illustrating a collector comprising a high-polymer material positioned in a bipolar cell of a bipolar electrode battery according to one embodiment of the present invention.

FIG. 1 is a conceptual diagram illustrating the structure of the bipolar electrode battery. The bipolar electrode battery has a structure wherein collector 10 (a current collector or current collecting body), positive electrode 20, electrolyte layer 30, negative electrode 40 and electric current extracting plate 11 are laminated and collector 10 which is placed among the batteries serially connected to each other, serves as both the positive collector and the negative collector.

Conventionally, the collector of a bipolar electrode battery is usually made of a metal foil such as aluminum foil and copper foil. However, embodiments of the present invention utilize a collector containing a high-polymer material.

In the collector of a commonly-used battery which is not a bipolar electrode battery, the electric charge is transmitted through a plate which is placed on the edge part of the collector and the collector has a function of collecting the electric charge which is generated in the negative electrode in the plate, or transmitting the electric charge which is supplied from the plate to the positive electrode. Therefore, the electric resistance of the collector that is generated in the horizontal direction (surface direction) where the electric charge moves, needs to be low and, to decrease the electric resistance in the horizontal direction, a metal foil having a certain thickness is used. As a result, the weight of the battery is increased.

On the other hand, in collector 10 of the bipolar electrode battery, the electric charge generated in negative electrode 40 is directly supplied to positive electrode 20 that exists in the opposite side of collector 10. Therefore, the electric current flows in the direction of the laminated layer that is a structural element of the bipolar electrode battery and does not have to flow in the horizontal direction. As a result, to decrease the electric resistance in the horizontal direction, the metal foil used in a conventional battery is not necessary. Also, since the electric resistance in the horizontal direction can be high, the thickness of the collector can be thin.

A metal plate (i.e. an electrode extracting plate) contacting the surface of the collector is preferably used to support the collector. The surface of the collector may electrically contact the surface of the metal plate, thereby allowing an electrical current to flow from the collector through the metal plate to external leads connecting to an electrically powered device, for example, an electrical motor. However, the metal plate need not physically contact the collector surface, and may alternatively be electrically connected to the side of the collector, thereby reducing the contact resistance.

By making collector 10 from materials including high-polymer materials, it may be possible to trim the weight of the collector and improve the energy density of the bipolar electrode battery without reducing battery performance.

Figure 2A:
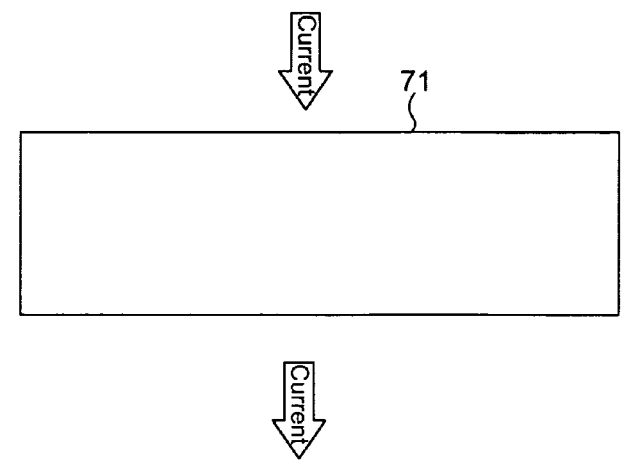
FIG. 2A is a cross-sectional side view diagram conceptually illustrating a bipolar cell of a bipolar electrode battery showing current flow to a collector comprising a high-polymer material according to one embodiment of the present invention.
Figure 2B:
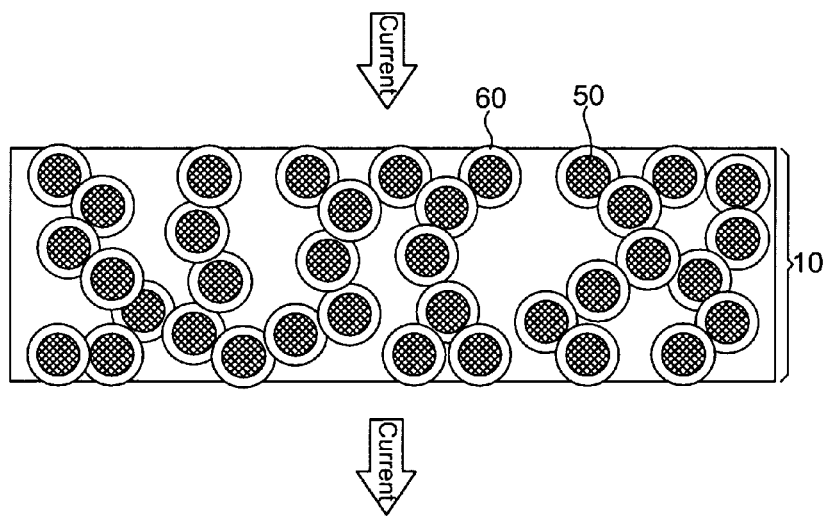
FIG. 2B is a cross-sectional side view diagram conceptually illustrating a bipolar cell of a bipolar electrode battery showing current flow to a collector comprising a high-polymer material and electrically conductive particles according to another embodiment of the present invention.

FIG. 2A and FIG. 2B are cross-sectional side view diagrams illustrating current flowing to a collector 10 of the bipolar electrode battery of the present invention. Collector 10 may comprise conductive particles 50 (as shown in FIG. 2B) which have a high binding property to a high-polymer material 60; or conductive high-polymer material cast as a film 71 (as shown in FIG. 2A). As shown in FIGS. 2A and 2B, the electric current flows in the vertical direction through collector 10 from the one electrode to the other electrode, and the conductivity in the vertical direction is provided by conductive particles 50 or conductive high-polymer film 71. As a result, it is possible to decrease the mass of collector 10.

When the collector contains a high-polymer material that does not have electrical conductivity, electrically conductive particles (which are also called conductive fillers) may be added to the high-polymer material to increase its electrical conductivity. The electrically conductive particles may be selected from materials that do not have ionic conductivity when used as an electric charge-transporting medium. Also, the conductive particles may be selected from materials that can withstand the high electrical potential applied to the positive electrode and negative electrode materials.

Suitable electrically conductive particles may include aluminum particles, SUS (stainless) particles, carbon particles, silver particles, gold particles, copper particles and titanium particles, but the materials are not limited to these specific metals and other metals and metal alloys may be used. The form of the conductive particles is not limited to the previously described particles. In particular, carbon nano-tube particles may be useful, and a particulate form of a conductive resin composition may also be used.

The distribution of the conductive particles in the collector may not be uniform. The distribution of the particles inside the collector may be changed. A plurality of the conductive particles may be used or the distribution of the conductive particles inside the collector may be changed. For example, different desired conductive particles may be used in the part that contacts the positive electrode and the one that contacts the negative electrode.

Preferable examples of the conductive particles used for the positive electrode may include aluminum particles, SUS particles and carbon particles, and carbon particles are more preferably used. Preferable examples of the conductive particles used for the negative electrode may include silver particles, gold particles, copper particles, titanium particles, SUS particles and carbon particles, with carbon particles are being more preferably used.

Carbon particles such as carbon black and graphite, have a significantly wide voltage window, are stable in a wide range for both the positive electrode and the negative electrode, and have an excellent conductivity. Also, since the weight of the carbon particles is extremely light, the battery mass may be further decreased by using electrically conductive carbon particles as opposed to electrically conductive metal particles. Furthermore, since the carbon particles are usually used as the additive for enhancing the conductivity of electrodes, if the carbon particles are contacted with this type of conductive additive, the contact resistance is extremely low because they are made of the same material. When the carbon particles are used as the conductive particles, by depositing a hydrophobic treatment on the surface of the carbon, it is possible to decrease the blending of the electrolyte thereby making it difficult for the electrolyte to penetrate into the void of the collector.

According to the present invention, the collector contains a high-polymer material (hereinafter referred to as "binder") that binds together the conductive particles. By using a binder as the structural material of the collector, it is possible to increase the binding properties of the conductive particles and enhance the reliability of the battery. The binder may be selected from materials that can endure the high electrical potential applied to the positive electrode and the negative electrode.

The distribution of the binder in the collector may not be uniform. The distribution of the binder inside the collector may be changed. A plurality of the binders may be used and the distribution of the binders inside the collector may be changed. For example, different desired binder may be used in the part which contacts the positive electrode and the one which contacts the negative electrode.

Suitable binders may include high molecular weight polymers (i.e. high-polymers) such as polyethylene (PE), polypropylene (PP), poly ethyleneterephthalate (PET), poly ethernitrile (PEN), polyimide (PI), polyamide (PA), polytetrafluoroethylene (PTFE), styrene-butadiene rubber (SBR), polyacrylonitrile (PAN), poly(methyl)acrylate (PMA), poly(methyl)methacrylate (PMMA), poly(vinyl) chloride (PVC), poly vinylidene fluoride (PVdF) or mixtures thereof. These materials have a significantly large voltage window, are stable in a wide range for both the positive electrode and the negative electrode, and can increase the binding property.

Also, by using the high-polymer material as a major component of the collector body, the problem of metal deposition on the metal foil may be reduced. More preferably, polyvinylidene fluoride is used as the binder. Because polyvinylidene fluoride has a high durability and chemical resistance, it is generally used as a binder for both of the electrodes, and it is therefore possible to increase the binding properties of both of the electrodes. The collector may contain other materials as may be desirable.

The ratio of the binder to the conductive particles in the collector is not limited to a specific one, but preferably, of the total of the binder and the conductive particles, 2 to 20% by mass of the conductive particles should exist. By having a sufficient amount of conductive particles, it is possible to secure the conductivity in the collector.

The void ratio of the collector is preferably 15% or lower. By keeping the void ratio of the collector low, the penetration of the electrolyte to the collector is prevented and its durability is increased. The adjustment of the void ratio can be achieved by controlling the amount of the solvent that is used to create the collector. By increasing the amount of the solvent, it is possible to increase the void ratio, and meanwhile, by decreasing the amount of the solvent, it is possible to decrease the void ratio. The lower limit of the void ratio is not limited to a specific ratio, but when considering the weight saving of the collector, it is preferably 5% or higher.

The thickness of the collector is not limited to specific size, but it is preferably thin enough to increase the power output density of the battery. As described above, in the bipolar electrode battery, the collector that exists between the positive electrode and the negative electrode can have a high electric resistance in the direction horizontal to the laminated layer. Therefore, it is possible to reduce the thickness of the collector. More practically, the thickness of the collector is preferably 0.1-15 micrometers. Here, when a thin collector is manufactured, it is preferable to use the inkjet printing method that is described below.

The structures of the positive and negative electrodes are not limited to specific ones. Known positive and negative electrodes can be used. The positive electrode contains a positive active material and the negative electrode contains a negative active material. The positive and negative active materials can be selected depending on the type of the battery.

For example, when the battery is a lithium ion secondary battery, examples of materials suitable for the positive active material may include Li—Co group complex oxides such as LiCoO$_2$, Li—Ni group complex oxides such as LiNiO$_2$, Li—Mn group complex oxides such as spinel LiMn$_2$O$_4$ and Li—Fe group complex oxides such as LiFeO$_2$. Suitable materials may also include phosphate compounds containing lithium and a transition metal, such as LiFePO$_4$, sulfated compound, transition metal compounds such as V$_2$O$_5$, MnO$_2$, TiS$_2$, MoS$_2$ and MoO$_3$, sulfide, PbO$_2$, AgO, NiOOH, and the like. Combinations and mixtures of two or more of these materials may also be used to fabricate positive electrodes.

Examples of materials suitable for fabricating the negative electrode may include carbon materials such as crystalline carbon material and non-crystalline carbon materials and metal materials such as Li$_4$Ti$_5$O$_{12}$. More practically, they may include natural black lead, artificial black lead, carbon black, active carbon, carbon fiber, coke, soft carbon, hard carbon, and the like. Combinations and mixtures of two or more of these materials may also be used to fabricate negative electrodes.

The electrodes may contain other elements such as, for example, conductive additives, ion-conductive high-polymers and supporting electrolyte salts. Examples of suitable conductive additives may include acetylene black, carbon black and graphite. By adding the conductive additive, the conductivity of electrons that is generated in the electrodes may be increased and the battery performance may be improved. Examples of suitable ion-conductive high-polymers may include poly(ethylene)oxide (PEO), poly(propylene)oxide (PPO), and the like. The supporting electrolyte salt may be selected depending on the type of the battery. When the battery is a lithium ion battery, examples of suitable supporting electrolyte salts may include LiBF$_4$, LiPF$_6$, Li(SO$_2$CF$_3$)$_2$N, LiN(SO$_2$C$_2$F$_5$)$_2$, and the like. Combinations and mixtures of two or more of these materials may also be used.

The blending ratios and quantities of the structural materials, including active materials, lithium salts and conductive additives, used to fabricate the electrodes is preferably determined based on the desired usage of the battery (e.g. whether power output is emphasized or energy is emphasized, and the like) and the ion conductivity within the electrolyte layer.

The electrolyte layer can be a liquid, a gel and/or a solid phase. Considering safety factors and the prevention of liquid leakage if the battery is broken, the electrolyte layer is preferably a gel polymer electrolyte layer or an all-solid electrolyte layer. By using the gel polymer electrolyte layer as the electrolyte, the fluidity of the electrolyte is eliminated, the leakage of the electrolyte into the collector is prevented and the ion conductivity among each layer can be blocked. Examples of the host polymer of the gel polymer electrolyte may include PEO, PPO, PVdF, polyvinylidene fluoride-hexafluoropropylenecopolymer (PVdF-HFP), PAN, PMA and PMMA. An electrolytic solution that is generally suitable for use in a lithium ion battery may be used as the electrolyte fluid in the host polymer of the gel polymer electrolyte.

Furthermore, when an all-solid electrolyte layer is used as the electrolyte, leakage of the electrolyte into the collector may be prevented and the ion conductivity among each layer may be blocked, because flow of the electrolyte is inhibited. When an all-solid electrolyte layer is used, the void ratio of the collector can be made high, since the electrolytic solution need not penetrate the collector from the electrolyte layers.

An exemplary gel polymer electrolyte may be manufactured by adding an electrolytic solution such as that typically used for a conventional lithium battery, to an all-solid-type high-polymer solution, such as an aqueous solution of PEO and/or PPO. The gel polymer electrolyte may also be manufactured by mixing the electrolytic solution with a solution of high-polymer binder that does not have substantial lithium ion conductivity, such as PVDF, PAN and PMMA. The ratio of the high-polymer that constitutes the gel polymer electrolyte to the electrolytic solution is not limited to a specific ratio. The concentration range of the high-polymer may range from 0-100 percent by weight. Similarly, the concentration range of the electrolyte in the electrolytic solution may range from 0-100 percent by weight. In addition, an all-solid electrolyte may include electrolyte additives that have at least some lithium ion conductivity, such as the previously identified high-polymer binders, inorganic solids, and conductive particles.

In order to enhance the ion conductivity, a supporting salt is preferably contained in the electrolyte layer. When the battery is a lithium ion secondary battery, it is possible to use $LiBF_4$, $LiPF_6$, $LiN(SO_2CF_3)_2$, $LiN(SO_2O_2F_5)_2$, or mixtures thereof, as the supporting salt. However, the supporting salts that can be used in the present invention are not limited to these particular lithium salts. As described above, polyalkylene oxide group high polymers, such as PEO and PPO, can dissolve lithium salts such as $LiBF_4$, $LiPF_6$, $LiN(SO_2CF_3)_2$ and $LiN(SO_2O_2F_5)_2$, and may be suitable as supporting salts. Also, by creating a cross-linked structure within the electrolyte layers, excellent mechanical strength of the bipolar electrode cell stack may be achieved.

An assembled battery module may be fabricated by electrically connecting serially a plurality of batteries, electrically connecting them in parallel, or electrically connecting them both serially and in parallel. By connecting the batteries serially or in parallel, it is possible to freely adjust the storage capacity and voltage of the batteries. The number of batteries and the method used to connect them in an assembled battery module may be determined based on the desired power output and capacity of the battery. When an assembled battery module is constituted, the safety of the battery is increased compared to a single battery. By constituting an assembled battery module, it is possible to decrease the influence of deterioration of one unit cell on the entire battery.

The battery or assembled battery module can be preferably used as the electric power source for powering a vehicle. When the battery or the assembled battery module of the present invention is used for a hybrid electric vehicle or electric vehicle, it is possible to increase the life span and reliability of the vehicle and its power source. However, usage of the batteries and battery modules of the present invention is not limited to vehicles, and it is possible to use the batteries and battery modules in, for example, an electric train, or any other device that may require significant electrical power.

Various methods for manufacturing a bipolar electrode battery according to the present invention will now be described. A coating method may be used to fabricate a collector made of a binder and conductive particles. For example, virtually any coating method wherein a slurry containing a binder and conductive particles is formulated, coated and cured may be used. Exemplary coating methods include forward and reverse roll coating, gravure coating, curtain coating, extrusion die coating, spray coating, screen printing, and the like may be used. Since suitable binders (high-polymer material) and conductive particles useful in formulating a coating slurry have been previously described, these materials will not be additionally described below.

Although it is possible to manufacture a collector by using the coating method, in this example, the collector is manufactured by formulating a collector ink which contains the structural elements of the collector, preferably, using an inkjet printing method. By using the inkjet printing method, it is possible to manufacture a collector with a uniform thickness.

Also, when the inkjet printing method is used, a thin collector can be manufactured. Therefore, energy density of the battery may be improved. In the inkjet printing method, an ink which contains all the structural elements may be ejected, or multiple inks which contain various elements. When multiple inks are ejected, it is easy to formulate each element by ratio.

The inkjet printing method is a printing method wherein liquid-type ink is ejected from a nozzle and the ink is attached to an object. Depending on the way the ink is ejected, the inkjet printing method is classified into a piezoelectric inkjet printing method, thermal inkjet printing method and Bubble Jet (registered trademark) method. The piezoelectric inkjet printing method is a method wherein ink is ejected from a nozzle due to the deformation of piezoelectric print head elements that are placed on the bottom of the ink chamber where ink is stored, and deformed when an electric current flows. The thermal inkjet printing method is a method wherein ink is ejected by the energy of explosion of moisture vapor that is generated when ink is heated by a heater and evaporated. As is the case with the thermal inkjet printing method, the Bubble Jet™ (registered trademark of Canon Corp., Tokyo Japan) method is a method wherein ink is ejected by the energy of water vapor that is generated when ink is evaporated. Although the heated parts are different, the thermal inkjet printing method and the Bubble Jet™ method have the same basic printing elements. When the collector is manufactured by the inkjet printing method, it is possible to effectively manufacture the thin collector with a uniform thickness.

The electrodes may be manufactured by the inkjet printing method by preparing electrode ink. Preferably, the bipolar electrode battery is manufactured by a method which contains a step wherein the collecting electrode is created by depositing collector ink containing the conductive particles by the inkjet printing method; a step wherein the positive electrode is created by depositing positive electrode ink containing the positive electrode active material by the inkjet printing method; and a step wherein the negative electrode is created by depositing negative electrode ink containing the negative electrode active material by the inkjet printing method. When the electrodes are created using an inkjet printing method by depositing ink containing electrode materials, such as active material or auxiliary conductive particulate materials, it may be possible to manufacture very thin electrodes with uniform thickness. The inkjet printing method can be used for manufacturing not only the collector and the electrodes but also a solid electrolyte layer.

A method for manufacturing the bipolar electrode battery having a solid electrolyte layer wherein the inkjet printing method is use will be described below. However, the present invention is not limited to the form described below. When the bipolar electrode battery is manufactured by using the inkjet printing method, the collector ink, positive electrode ink, negative electrode ink and electrolyte ink are prepared, and the ink is ejected using a inkjet device.

Components contained in the collector ink may include a binder, conductive particles and solvent. The practical forms of the binder and the conductive particles are described above.

Components contained in the positive electrode ink may include a positive electrode active material, binder, conductive additive and solvent. The positive electrode ink may be a single type or plural ones. Examples of the binder may include polyethylene (PE), polypropylene (PP), polyethyleneterephthalate (PET), polyethernitrile (PEN), polyimide (PI), polyamide (PA), polytetrafluoroethylene (PTFE), styrenebutadiene rubber (SBR), polyacrylonitrile (PAN), polymethylacrylate (PMA), polymethylmethacrylate (PMMA), polyvinyl chloride (PVC), polyvinylidene fluoride (PVdF) or mixtures thereof.

In order to prevent the aggregation of the positive electrode active materials and conductive additive, a dispersing agent may be used. Suitable dispersing agent include any compounds which have a dispersing or dispersion stabilizing property for the particular particles in the particular binder and solvent system used, such as, for example, polyoxystearylamine for carbon black particles dispersed in PVdF in n-methyl pyrollidone (NMP).

Components of the negative electrode ink may include a negative electrode active material, binder, conductive additive and solvent. The negative electrode ink may be of a single type or several types. As the binder, the same types of binder as those of the positive electrode ink can be used.

Components of the electrolyte ink that is used for manufacturing the solid electrolyte layer may include the solid electrolyte or its original material and solvent. The electrolyte ink contains at least the solid electrolyte or its original material. When a method wherein the original material of the solid electrolyte is used, coated by using the inkjet printing method and polymerized, is used, it is possible to keep the viscosity of the ink low and prevent the clogging caused by the inkjet device.

An solvent may be included as an ink component for any of the inks. The solvent used for each ink is not limited to any particular solvents. Examples of suitable solvents may include N-methylpyrrolidone (NMP), dimethylcarbonate (DMC) and acetonitrile. Depending on the increase and decrease of the amount of the solvent, it is possible to control the viscosity of the ink.

The formulating ratios of components contained in each ink are not limited to specific ratios. However, the viscosity of the ink should be low enough to use the inkjet printing method. On the other hand, from the perspective of improving the operating efficiency, the concentration of components is preferably high. The method for keeping the viscosity low may include a method wherein the temperature of the ink is increased. The compounds contained in the ink may be changed so that the viscosity becomes low. The viscosity of each ink that is supplied to the inkjet device is not limited to a specific one, but it is preferably about 1-100 centipoise (cP).

After each ink is prepared, the inks are applied using an inkjet printing method to create the collector, electrodes and solid electrolyte layer. The amount of the ink ejected from the nozzle of the inkjet device is extremely small and it is possible to eject an almost equivalent volume of ink. Therefore, the electrodes formed by the electrode inks and the adherent solid electrolyte layer, are extremely thin and uniform. Also, when the inkjet printing method is used, the thickness and forms of the collector, electrodes and solid electrolyte layer are precisely controlled.

The mechanism of depositing ink used by the inkjet device can be a piezoelectric inkjet printing method, a thermal inkjet printing method or a BubbleJet™ method. When the collector, electrodes and solid electrolyte layer are created, their forms are determined beforehand. If the collector, electrodes and solid electrolyte layer are created based on the computer-generated images, their working property becomes excellent. Determination of the forms and manufacturing of the collector, electrodes and solid electrolyte layer by using the computer are widely known. They can be done along with the image generation using the computer and printer and the printout operation. Therefore, the present invention can relatively easily achieve industrial production in that it can apply the knowledge developed in this field.

The volume of the particles ejected from the inkjet device is preferably in a range of 1-100 picoliters. If the volume of the particles ejected is too small, the decrease of the vibration might be insufficient. On the other hand, if the volume of the particles ejected is too large, the decrease of the vibration might be also insufficient. The volume of the particles ejected by using the inkjet device is about the same and the uniformity of the electrodes and battery manufactured by the device is significantly high.

The number of times of ejection by the inkjet printing method may be determined based on the proportion of the thickness and the structural materials of the collector, electrodes and solid electrolyte layer. When the thickness is not sufficient with one printing operation, the printing operation is repeated two times or more on the same surface. In other words, the same ink is repeatedly printed on the same substrate. As a result, the collector, electrodes and solid electrolyte layer with desired thickness can be created. When each layer is created using the inkjet printing method, the uniformity of each layer created is significantly high. Therefore, even when the layers are repeatedly laminated, high uniformity can be maintained.

The coating procedure of the ink when all of the collector, positive and negative electrodes and solid electrolyte layer are manufactured by the inkjet printing method is not limited to specific ones. Each of the electrode layers may be created by using one inkjet device, or the electrode assembly may be manufactured by an assembly-line operation, using one inkjet print head for preparing the positive electrode, another inkjet print head for preparing the solid electrolyte layer and another inkjet print head for preparing the negative electrode.

After the electrodes are created, the solvent is removed by drying. When the original material of the solid electrolyte is not polymerized to become the solid electrolyte, polymerization may be performed. For example, when the ink contains a photo polymerization initiator, the polymerization of the original material may be performed by exposing the ink to a predetermined source of actinic radiation such as ultraviolet or visible light.

The presence of the particles in the collector is not necessarily important. The high polymer itself may have conductivity. In other words, it is possible to use a film made of a conductive high polymer as the collector. A conductive high polymer is a high molecular weight polymer that exhibits electrical conductivity, such as, for example, a high molecular weight polypyrrole. With respect to the required molecular weight for a high polymer, the weight average molecular should generally be greater than about 5,000 Daltons (Da), more preferably greater than 10,000 Da, more preferably still greater than 20,000 Da, most preferably greater than 50,000 Da, in order to promote good adhesion of any coated layers to the collector. Preferably, the weight average molecular weight is selected to be about 10 million Da or less, more preferably 5 million Da or less, most preferably 1 million Da or less, in order to impart acceptable flexibility to the collector.

The conductive high polymer has conductivity and is selected from materials that do not have conductivity with ion that is used as the electric charge transporting medium. It is considered that, in the conductive high polymer, coupled polyene group creates an energy band and shows conductivity. It is possible to use a polyene group conductive high polymer that is used in an electrolysis condenser as their representative example. More practically, examples of suitable conductive high polymers may include polyaniline, polypyrrole, polythiophene, polyacetylene, polyparaphenylene, polyphenylenevinylene, polyacrylonitrile, polyoxadiazole or mixture thereof. Since the collector bodies described herein does not have to have the same resistance value as that of the metal foil, it is possible to use the conductive high polymer and there is the advantage that there is a wide range of materials.

The resistance value of the collector is not limited to specific ones, but it is preferable to choose the conductive high polymer film so that the resistance value of the collector to that of the entire battery becomes 1/100 or less. The thickness of the collector is not limited to a specific one, but the thin collector is preferable from the perspective of increasing the power output density of the battery. As described above, in the bipolar electrode battery, the collector that exists between the positive electrode and the negative electrode may have a high electric resistance in the direction horizontal to the laminated layer. Therefore, it is possible to reduce the thickness of the collector. More practically, the thickness of the collector is preferably 0.1-15 micrometers.

Figure 3:
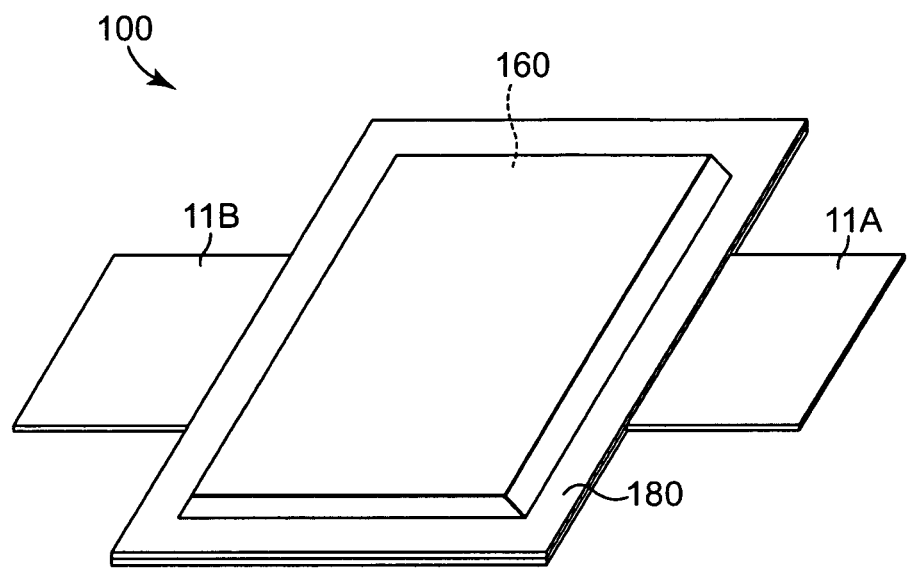
FIG. 3 is a perspective view diagram illustrating a bipolar electrode battery according to an additional embodiment of the present invention.

FIG. 3 is a perspective view diagram illustrating an exemplary embodiment of the bipolar electrode battery of the present invention. In this example, bipolar electrode battery 100 has a rectangular flat shape as shown in the FIG. and positive electrode plate 11A and negative electrode plate 11B which are used to extract the electric current, are placed on both sides of the bipolar electrode battery. Power generating element 160 is wrapped with a jacket material (for example, laminate film) of bipolar electrode battery 100, and power generating element 160, wrapped with the jacket material, is then heat-sealed with positive electrode plate 11A and negative electrode plate 11B pulled out.

Figure 4A:
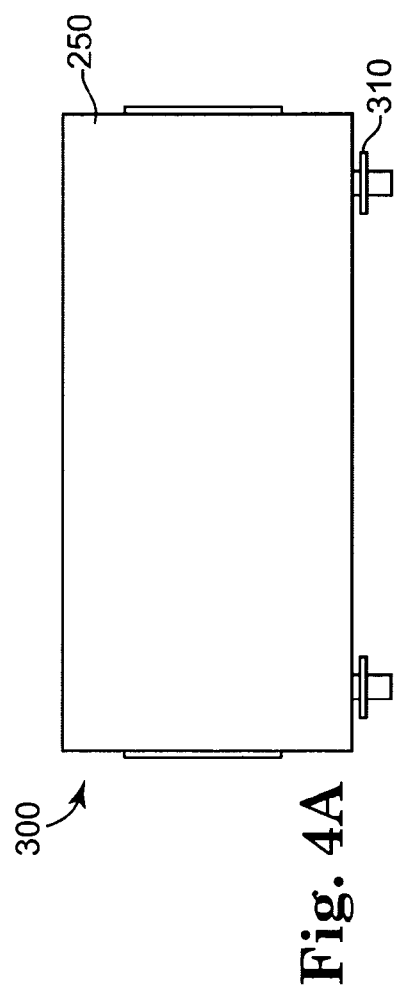
FIG. 4A is a top view diagram illustrating an assembled secondary storage battery module including multiple bipolar electrode batteries according to yet another embodiment of the present invention.
Figure 4B:
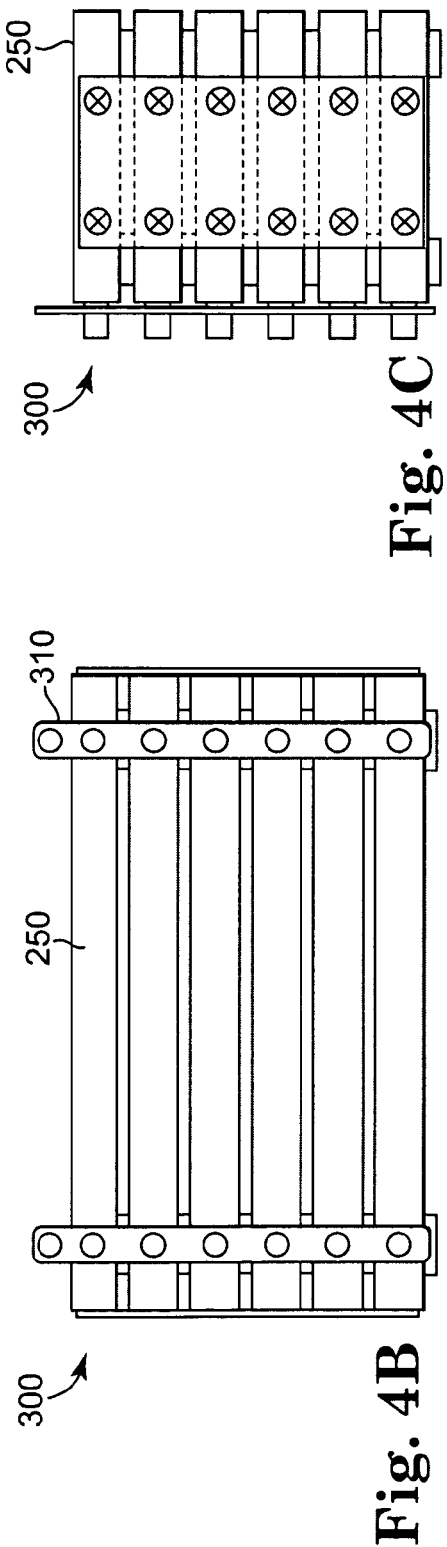
FIG. 4B is a side view diagram illustrating an assembled secondary storage battery module including multiple bipolar electrode batteries according to yet another embodiment of the present invention.
Figure 4C:
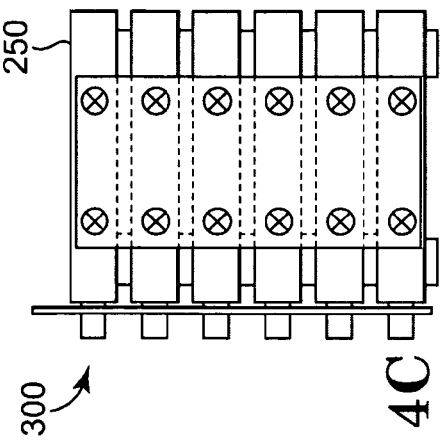
FIG. 4C is an end view diagram illustrating an assembled secondary storage battery module including multiple bipolar electrode batteries according to yet another embodiment of the present invention.

FIG. 4 is a perspective view diagram illustrating an exemplary embodiment of assembled battery module 300 of the present invention. In this example, the assembled battery module 300 may be created by electrically connecting multiple bipolar electrode batteries serially or in parallel. By electrically connecting a plurality of batteries 250 serially and/or in parallel, it is possible to create an assembled battery module 300. FIG. 4 shows the flat view (FIG. A), front view (FIG. B) and side view (FIG. C) of an assembled battery module 300. The batteries 250 are electrically connected to one another by using an electric connecting means such as a bus bar. A plurality of bipolar electrode cell layers of assembled batteries 250 may be laminated together using connecting jig 310. The number of pieces of the bipolar electrode batteries that are connected to create an assembled battery module 300, and the number bipolar electrode cell layers of assembled batteries 250 that are laminated to create assembled battery module 300 is determined based on the battery capacity and power output of the vehicle (e.g. an electric vehicle) which carries the battery.

Figure 5:
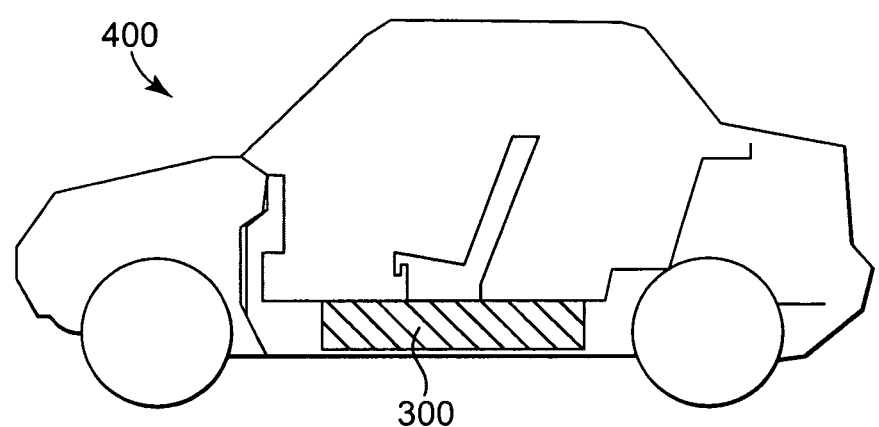
FIG. 5 is a cross-sectional side view diagram illustrating a motor vehicle equipped with an assembled secondary storage battery module including multiple bipolar electrode batteries according to still another embodiment of the present invention.

To load assembled battery module 300 in electric vehicle 400, as shown in FIG. 5, the battery is placed under the seat located in the center of the body of electric vehicle 400. This is because, if the battery is placed under the seat, it is possible to have more space inside and more trunk room. Here, the location where assembled battery module 300 is placed is not limited to the space under the seat, but it can be the lower part that is a rear-located trunk room or the engine room located in the front of the vehicle. Electric vehicle 400 which uses the previously described assembled battery module 300 has a high durability and can provide sufficient power output even if it is driven for a long period of time. Furthermore, it is possible to provide an electric vehicle and hybrid vehicle with good mileage and excellent driving performance.

EXAMPLES

Example 1

1. Manufacture of the Positive Electrode

By mixing $LiMn_2O_4$ (22 wt. %) as the positive electrode active material, acetylene black (6 wt. %) as the conductive additive, polyethyleneoxide (PEO; 18 wt. %) as the ion conductive high polymer, $Li(C_2F_5SO_2)_2N$ (9 wt. %) as the supporting salt, N-methylpyrrolidone (NMP; 45 wt. %) as the slurry viscosity adjusting solvent and azobisisobutyronitrile (AIBN; small amount) as the polymerization initiator, positive electrode slurry was formulated.

The positive electrode slurry was coated on one side of a PET film with a thickness of 100 micrometers and the coated film was heated at 110° C. for 4 hours to perform thermal polymerization and cured, thereby obtaining the positive electrode. The positive electrode was supplied with a terminal for making electrical contact in a bipolar electrode battery by coating the positive electrode slurry on an aluminum sheet having a thickness of 20 micrometers, which was similarly thermally cured and positioned in electrical connection with the positive electrode to form the terminal.

2. Manufacture of the Negative Electrode

By mixing $Li_4Ti_5O_{12}$ (14 wt. %) as the negative electrode active material, acetylene black (4 wt. %) as the conductive additive, PEO (20 wt. %) as the ion conductive high polymer, $Li(C_2F_5SO_2)_2N$ (11 wt. %) as the supporting salt, NMP (51 wt. %) as the slurry viscosity adjusting solvent and AIBN (small amount) as the polymerization initiator, negative electrode slurry was formulated.

The negative electrode slurry was coated on one side of a PET film with a thickness of 100 micrometers and heated at 110° C. for 4 hours to perform thermal polymerization and thereby cure, forming the negative electrode. The negative electrode was supplied with a terminal for making electrical contact in a bipolar electrode battery by coating the negative electrode slurry on an SUS sheet having a thickness of 20 micrometers, which was similarly thermally cured and positioned in electrical connection with the negative electrode to form the terminal.

3. Manufacture of the Electrolyte Layer

The electrolyte slurry was formulated by preparing PEO (64.5 wt. %) as the ion conductive high polymer and $Li(C_2F_5SO_2)_2N$ (35.5 wt. %) as the supporting salt, using acetonitrile as the viscosity adjusting solvent. The electrolyte slurry was poured between glass plates having a gap of 50 micrometers that was dried thereby making the electrolyte layer with a thickness of 40 micrometers.

4. Manufacture of the Collector

By preparing Au—Ag microparticles (average particle diameter: 10 micrometers; 90 wt. %) as the conductive particles and polyvinylidene fluoride (PVdF; 10 wt. %) as the high polymer material and using NMP as the viscosity adjusting solvent, the collector slurry containing the conductive particles was formulated. Using a doctor blade, the collector slurry was coated on the upper part of the positive electrode that was created on the above described PET film. Then, the coated film of the collector slurry was pressed so that the thickness of the film of the collector became 30 micrometers.

The void ratio of the collector was 25%.

5. Assembly of the Bipolar Electrode Battery

The terminal positive electrode, negative electrode, terminal negative electrode, electrolyte layer and positive electrode-collector assembly were manufactured and cut into 120 mm×70 mm sheets. Then, the terminal positive electrode was attached to the electrolyte layer. After that, the negative electrode which was peeled off from the PET film, the positive electrode-collector assembly which was peeled off from the PET film and the electrolyte layer were sequentially laminated two times. Finally, the terminal negative electrode was attached thereby making the three-layered bipolar electrode battery. Al plate and Ni plate were welded to the terminal positive electrode and the terminal negative electrode respectively. The obtained battery was vacuum-sealed into an aluminum laminate thereby completing the bipolar electrode battery.

Example 2

By preparing graphite (5 micrometers; 90 wt. %) as the conductive particles and polyvinylidene fluoride (PVdF; 10 wt. % in n-methylpyrrolidone) as the high polymer material and using NMP as the viscosity adjusting solvent, the collector slurry containing carbon particles was formulated. The same procedure as that of Example 1 was used to manufacture the bipolar electrode battery except that the collector made of carbon particles (graphite) was created by using the above described collector slurry.

Comparative Example 1

The positive electrode slurry which was used in Example 1 was coated on one side of the SUS foil with a thickness of 30 micrometers which was heated at 110° C. for 4 hours to perform the thermal polymerization and cured thereby obtaining the positive electrode-collector assembly. Next, the negative electrode slurry used in Example 1 was coated on the reverse side of the SUS foil, which was then dried thereby obtaining the positive electrode-collector-negative electrode assembly, wherein the positive electrode, collector and negative electrode were laminated.

The assembly created above was cut into 120 mm×70 mm. Then, the terminal positive electrode and electrolyte layer that were used in Example 1 were attached. After that, the positive electrode-collector-negative electrode assembly and the electrolyte were sequentially laminated two times. Finally, the terminal negative electrode was attached thereby making the three-layered bipolar electrode battery. Al plate and Ni plate were welded to the terminal positive electrode and the terminal negative electrode respectively. The obtained battery was vacuum-sealed into an aluminum laminate thereby completing the bipolar electrode battery.

Battery Evaluation 1

A charging and discharging test was conducted on each battery of Examples 1 and 2 and Comparative Example 1. In this test, the batteries were charged with a constant current (CC) of 0.5 mA until 8.1 V and then, the batteries were charged at a constant voltage (CV) and the total charging time was 10 hours. After that, the batteries were discharged with about 1 mA for 5 seconds. The internal resistance of the batteries was calculated based on the voltage at the time of the discharge. The evaluation was shown as the proportion when the internal resistance of the battery of Comparative Example 1 was 100%. Also, the weight of the batteries was measured and the weight of the batteries of Examples 1 and 2 was measured when the weight of the battery of Comparative Example 1 was 100%. The results are shown in Table 1.

TABLE 1

|  | Example 1 | Example 2 | Comparative Example 1 |
|---|---|---|---|
| Battery Internal Resistance | 42% | 60% | 100% |
| Battery Weight | 90% | 84% | 100% |

When Comparative Example 1 is compared with Examples 1 and 2, it is found that the resistance value of Comparative Example 1 is larger than those of Examples 1 and 2. From this fact, it is assumed that, by creating the collector with the conductive particles, the electric resistance is decreased between the electrodes and the collector. Its detailed mechanism is not clear, but it is considered that the connection to the conductive additive inside the electrodes is good when the micro particles are used. Also, it is found that, by creating the collector from the conductive particles, weight saving can be achieved and the power output density can be improved.

Example 3

1. Manufacture of the Positive Electrode Ink $LiMn_2O_4$ (85 wt. %) as the positive electrode active material and acetylene black (5 wt. %) as the conductive additive were prepared. NMP was used as the slurry viscosity adjusting solvent to adjust the viscosity of the ink. Here, the above described positive electrode slurry was coated on aluminum with a thickness of 20 micrometers by using the inkjet printing method which was then dried thereby making the terminal positive electrode.

2. Manufacture of the Negative Electrode Ink

Hard carbon (90 wt. %) as the negative electrode active material and PVdF (10 wt. %) as the binder were prepared. NMP was used as the slurry viscosity adjusting solvent to adjust the viscosity of the ink. Here, the above described negative electrode slurry was coated on copper with a thickness of 20 micrometers by using the inkjet printing method which was then dried thereby making the terminal negative electrode.

3. Manufacture of the Electrolyte Ink

PC-EC 1MLiBETI (90 wt. %) as the electrolyte solution and PVdF-HFP that contains 10% of HFP copolymer (10 wt. %) as the host polymer were prepared. Dimethylcarbonate (DMC) was used as a solvent to adjust the viscosity of the ink.

4. Manufacture of the Collector Ink

Graphite comprising carbon particles (average particle diameter: 0.8 m; 90 wt. %) as the conductive particles and PVdF (10 wt. %) as the binder were prepared. NMP was used as the viscosity adjusting solvent to adjust the collector ink that contains metal micro particles.

5. Manufacture of the Bipolar Electrode Battery

The terminal positive electrode which was cut into 120 mm×70 mm was placed in an inkjet coating device and the electrolyte ink was coated by the inkjet printing method which was then dried thereby creating the electrolyte layer.

Ink application using the inkjet printing method was performed by the procedure described below. Here, to prevent a problem of melting the plastic parts positioned at the inkjet printhead due to the ink solvent, the parts at the entrance of the inkjet printhead were replaced with metal parts, and the ink was directly supplied to the metal parts from the ink chamber. Also, to prevent deposition or sedimentation of the active materials of the ink with the ink chamber, the ink chamber was constantly stirred by using a rotary vane mixing device.

The inkjet printer was controlled using a commercially available personal computer and software. The ink was coated by printing patterns created on the computer by using the inkjet printer. Here, when the ink was coated on the metal foils, since it was difficult to directly supply the metal foils to the printer, the metal foils were attached to size A4 bond papers that were directly supplied to the printer.

After the electrolyte layer was created, the negative electrode ink was coated by the inkjet printing method that was then dried thereby creating the negative electrode. Next, by coating the collector ink by the inkjet printing method and drying it, the collector with a thickness of 30 micrometers (void ratio of 14%) was created. Furthermore, the positive electrode ink was coated thereby creating the terminal positive electrode-electrolyte layer-negative electrode layer-collector layer-positive electrode layer. This procedure was repeated two times and then, by attaching the terminal negative electrode, the three-layered bipolar electrode battery was manufactured. Al plate and Ni plate were welded to the terminal positive electrode and the terminal negative electrode respectively. The obtained battery was vacuum-sealed into an aluminum laminate thereby completing assembly of the bipolar electrode battery.

Example 4

The same procedure as that of Example 3 was used to manufacture the bipolar electrode battery that has the collector with a void ratio of 11% except that the degree of the pressing of the collector was changed.

Example 5

The same procedure as that of Example 3 was used to manufacture the bipolar electrode battery that has the collector with a void ratio of 16% except that the degree of compressing of the collector was changed.

Comparative Example 2

The positive electrode slurry used in Example 3 was coated on one side of the SUS foil with a thickness of 30 micrometers by using the inkjet printing and dried, thereby obtaining the positive electrode-collector assembly. Then, the negative electrode slurry which was used in Example 3 was coated on the reverse side of the SUS foil by using the inkjet printing method and was then dried, thereby obtaining the positive electrode-collector-negative electrode assembly in which the positive electrode, collective body and negative electrode were laminated.

The manufactured assembly was cut into 120 mm×70 mm. Then, the terminal positive electrode that was used in Example 3 was placed in an inkjet coating device and the electrolyte ink was coated using the inkjet printing method and then dried thereby obtaining the electrolyte layer. After that, the positive electrode-collector-negative electrode assembly was laminated and the electrolyte ink was coated on the positive electrode by using the inkjet printing method that was then dried thereby obtaining the electrolyte layer. The same procedure was repeated two times and finally the terminal negative electrode was attached thereby making the three-bipolar electrode battery. Al plate and Ni plate were welded to the terminal positive electrode and the terminal negative electrode respectively. The obtained battery was vacuum-sealed into an aluminum laminate thereby completing the bipolar electrode battery.

Battery Evaluation 2

A charging and discharging test was conducted on each battery of Examples 3-5 and Comparative Example 2. In this test, the batteries were charged with a constant current (CC) of 0.5 mA to 12.6 V and then, the batteries were charged at a constant voltage (CV) and the total charging time was 10 hours. After that, the batteries were discharged with about 1 mA for 5 seconds. The internal resistance of the batteries was calculated based on the voltage at the time of the discharge. The evaluation was shown as the proportion when the internal resistance of the battery of Comparative Example 2 was 100%. Also, the weight of the batteries was measured and the weight of the batteries of Examples 3-5 was measured when the weight of the battery of Comparative Example 2 was 100%. The results are shown in Table 2.

TABLE 2

|  | Example 3 | Example 4 | Example 5 | Comparative Example 2 |
|---|---|---|---|---|
| Vacancy Ratio | 14% | 11% | 16% | — |
| Battery Internal Resistance | 86% | 84% | 82% | 100% |
| Battery Weight | 85% | 84% | 83% | 100% |

Furthermore, the charging and discharging cycle test was conducted on the batteries of Examples 3 and 4 (12.6-7.5 V, 10 mA (CC)). Each battery maintained its voltage even after the 50th cycle and showed a good cycle property.

From the results of Examples 3-5 and Comparative Example 2, it is found that the resistance value of Comparative Example 2 is larger than those of Examples 3-5. From this fact, it is assumed that, by creating the collector with the conductive particles, the electric resistance is decreased between the electrodes and the collector. Its detailed mechanism is not clear, but, as described above, it is considered that the connection to the conductive additive inside the electrodes is good when the micro particles are used. Also, it is found that, by creating the collector from the conductive particles, weight saving can be achieved and the power output density can be improved.

Example 6

1. Manufacture of the Positive Electrode

A positive electrode slurry was formulated by mixing $LiMn_2O_4$ (22 wt. %) as the positive electrode active material, acetylene black (6 wt. %) as the conductive additive, polyethyleneoxide (PEO; 18 wt. %) as the ion conductive high polymer, $Li(C_2F_5SO_2)_2N$ (9 wt. %) as the supporting salt, N-methylpyrrolidone (NMP; 45 wt. %) as the slurry viscosity adjusting solvent and azobisisobutyronitrile (AIBN; small amount) as the polymerization initiator.

2. Manufacture of the Negative Electrode

A negative electrode slurry was formulated by mixing $Li_4Ti_5O_{12}$ (14 wt. %) as the negative electrode active material, acetylene black (4 wt. %) as the conductive additive, PEO (20 wt. %) as the ion conductive high polymer, $Li(C_2F_5SO_2)_2N$ (11 wt. %) as the supporting salt, NMP (51 wt. %) as the slurry viscosity adjusting solvent and AIBN (small amount) as the polymerization initiator.

3. Manufacture of the Electrolyte Layer

The electrolyte slurry was formulated by mixing PC-EC 1MLiPF$_6$ (90 wt. %) as the electrolyte solution, PVdF-HPF (10 wt. %) that contains 10% of HFP copolymer, as the host polymer and DMC as the viscosity adjusting solvent.

4. Manufacture of the Collector

The conductive high polymers below were used to prepare a collector:

Conductive High Polymer Film 1: Polypropylene was used as the high polymer material and an Au micro-particle material was used as the conductive particles.

Conductive High Polymer Film 2: Polyimide was used as the high polymer material and an Au micro-particle material was used as the conductive particles.

Conductive High Polymer Film 3: Polypropylene was used as the high polymer material and carbon micro particles were used as the conductive particles.

Conductive High Polymer Film 4: Polyimide was used as the high polymer material and carbon micro particles were used as the conductive particles.

Conductive High Polymer Film 5: Polypropylene was used as the high polymer material and carbon micro particles were used as the conductive particles.

Conductive High Polymer Film 6: Polypropylene was used as the high polymer material and carbon micro particles were used as the conductive particles.

Conductive High Polymer Film 7: Polypropylene was used as the high polymer material and carbon micro particles were used as the conductive particles.

Conductive High Polymer Film 8: Polypropylene was used as the high polymer material and carbon micro particles were used as the conductive particles.

Conductive High Polymer Film 9: A polyaniline film (thickness: 30 micrometers) was used as the conductive high polymer film.

Comparative Example 3

A SUS metal foil was used as the collector. The size of each of the conductive high polymer films 1-9 and that of Comparative Example 3 was 140 mm×90 mm×30 micrometers (thickness). The results of measuring the volume resistance in the direction of the thickness of the conductive high polymer film are as shown in Table 3. When each of conductive high polymer films 1-9 are compared, it is assumed that, even though they are the same elements such as the case with conductive high polymer films 3 and 5, their resistance are different due to their formulating proportion.

TABLE 3

| Collector | Volume Resistance in the Thickness Direction ($\Omega \cdot cm$) |
| --- | --- |
| Conductive High Polymer Film 1 | $1 \times 10^{-2}$ |
| Conductive High Polymer Film 2 | $1 \times 10^{-2}$ |
| Conductive High Polymer Film 3 | $1 \times 10^{-1}$ |
| Conductive High Polymer Film 4 | $1 \times 10^{-1}$ |
| Conductive High Polymer Film 5 | $1 \times 10^{3}$ |
| Conductive High Polymer Film 6 | $1 \times 10^{2}$ |
| Conductive High Polymer Film 7 | $1 \times 10$ |
| Conductive High Polymer Film 8 | — |
| Conductive High Polymer Film 9 | $1 \times 10^{-4}$ |

The positive electrode slurry was coated on one side of a collecting foil (conductive high polymer films 1-9 and that of Comparative Example 2) by using a doctor blade and dried. The negative electrode slurry was coated on the other side of the same collecting foil and dried. The bipolar electrodes, wherein the positive electrode and negative electrode were coated on each side of the collector as described above, was hot-roller-pressed to laminate the bipolar electrode stack.

5. Assembly of the Bipolar Electrode Battery

The resulting bipolar electrodes were cut into 140 mm×90 mm squares including a 120 mm×70 mm square of electrode surrounded on all four edges by 10 mm of sealing space. The thickness of the positive electrode layer, collecting foil and negative electrode layer were each respectively 30 micrometers, resulting in a bipolar electrode with an overall thickness of 90 micrometers. The portion of the collecting foil where only the positive electrode layer was coated and the portion where only the negative electrode layer was coated were separately manufactured using the same procedure to be used for the outer layer of the bipolar electrode.

By impregnating the above described electrolyte solution into both sides of 20 micrometers of a porous film separator made of polypropylene and drying the DMC, the gel polymer electrolyte layer was obtained. The gel polymer electrolyte layer was placed on the previously described collecting foil where only the positive electrode layer was coated and 12 mm of a PE film with a thickness of 12 mm was placed on the sealing space of the collecting foil thereby making a sealing material. Similarly, four layers of the bipolar electrode and four polymer electrolyte layers were sequentially laminated to form a bipolar electrode assembly. Then, the collecting foil on which only the negative electrode layer was coated, was laminated by placing the surface of the negative electrode downward facing the bipolar electrode assembly, thereby forming a five-layered bipolar electrode battery.

The five-layered bipolar electrode battery was heat-pressed under a pressure of 0.2 MPa, a temperature of 160° C. and for 5 seconds to eliminate the interface between the electrolyte layer and the bipolar electrode. Then, by further heating the bipolar electrode battery for about one hour, it was sealed with the sealing material.

A 130 mm×80 mm square of Al plate with a thickness of 100 micrometers, which was used for extracting the electric current from both sides of the five-layered bipolar electrode which was further obtained in the above described manner, was placed in the five-layered bipolar electrode by sandwiching it, thereby obtaining the five-layered bipolar electrode battery. Here, a terminal for extracting the electric current with a thickness of 30×50 mm was placed on the Al plate.

This bipolar electrode battery was vacuum sealed so that a terminal for extracting the electric current was left exposed in the aluminum laminate layer thereby completing the bipolar laminate battery.

Battery Evaluation 3

The discharging and charging test was conducted on batteries of conductive high polymer films 1-9 and that of Comparative Example 4. In this test, the batteries were charged with a constant current (CC) of 0.5 mA until 12.5 V and then, the batteries were charged at a constant voltage (CV) and the total charging time was 10 hours. By measuring the weight of the batteries, the weight of the batteries of Examples 1-9 was calculated when the weight of the battery of Comparative Example 3 was 100%. The results are shown in Table 4.

TABLE 4

| Collector | Battery Weight |
|---|---|
| Conductive High Polymer Film 1 | 76% |
| Conductive High Polymer Film 2 | 79% |
| Conductive High Polymer Film 3 | 70% |
| Conductive High Polymer Film 4 | 74% |
| Conductive High Polymer Film 5 | 69% |
| Conductive High Polymer Film 6 | 69% |
| Conductive High Polymer Film 7 | 70% |
| Conductive High Polymer Film 8 | 70% |
| Conductive High Polymer Film 9 | 72% |
| Comparative Example 3 | 100% |

Table 4 shows that the weight of the collecting bodies which used the conductive high polymer films were lighter then the one which did not use the conductive high polymer film. Therefore, the power output density per weight of this type of collector was more improved than the conventional metal collector. This feature is the same as that of Examples 1 and 2. Also, the carbon particles contribute most significantly to the weight saving of the collector.

The batteries were discharged with 1 mA for 5 seconds and the internal resistance of the batteries was calculated based on the voltage at the time of the discharge. The resistance values when the internal resistance of conductive high polymer film 1 was 100% are shown in Table 5.

Table 5 shows that the internal resistance of the collecting bodies which used the conductive high polymer films was lower then the one which did not use the conductive high polymer film and their internal resistance was more improved than that of the conventional metal collector. This feature is the same as that of Examples 1 and 2. Although its detailed mechanism is not clear, it is considered that, when the collector uses the conductive particles and high polymer material, the contact of the collector with the conductive additive inside the electrodes improves.

TABLE 5

| Collector | Internal Resistance |
|---|---|
| Conductive High Polymer Film 1 | 100% |
| Conductive High Polymer Film 2 | 105% |
| Conductive High Polymer Film 3 | 102% |
| Conductive High Polymer Film 4 | 99% |
| Conductive High Polymer Film 5 | 121% |
| Conductive High Polymer Film 6 | 108% |
| Conductive High Polymer Film 7 | 103% |
| Conductive High Polymer Film 8 | 101% |
| Conductive High Polymer Film 9 | 92% |
| Comparative Example 3 | 125% |

Furthermore, when conductive high polymer films 1-9 are compared to each other, the resistance value of the collecting bodies that used the conductive high-polymer itself becomes lower (conductive high polymer film 9). Although its detailed mechanism is not clear, it is considered that, when the collector uses the conductive high polymer itself, the contact of the collector with the conductive material that constitutes the electrode material improves at the point contact of the conductive particles.

The ratio of the resistance value of the conductive high polymer film in the direction of its thickness, that is, the ratio of the resistance value of the conductive high polymer film in the direction of its thickness to the resistance value of the entire battery (resistance of the collector part/the resistance of the entire battery) is shown in Table 6. Here, as for Comparative Example 3, since the ratio is almost zero, it is omitted here.

Table 6 shows that the resistance of the collector to the battery resistance was extremely small and that even when the collector used the high polymer material, the resistance did not give a great influence on the battery performance.

TABLE 6

| Collector | Ratio of the Resistance of the Conductive High Polymer Film in the Thickness Direction to the Resistance of the Entire Battery |
|---|---|
| Conductive High Polymer Film 1 | 1/1000000 |
| Conductive High Polymer Film 2 | 1/1000000 |
| Conductive High Polymer Film 3 | 1/100000 |
| Conductive High Polymer Film 4 | 1/100000 |
| Conductive High Polymer Film 5 | 1/10 |
| Conductive High Polymer Film 6 | 1/100 |
| Conductive High Polymer Film 7 | 1/1000 |
| Conductive High Polymer Film 8 | 1/1000 |
| Conductive High Polymer Film 9 | 1/10000000 |

The output of the battery is improved by a decrease in the contact resistance. However, when the resistance value becomes about one tenth of the entire battery, it becomes influential to the internal resistance of the battery and the output of the battery tends to decrease. Therefore, it is considered preferable to choose a resistance value of one hundredth or lower of the entire battery. As for the porosity, it is considered that, since the collector used the high polymer material as the main element, it had little void and the penetration of the electrolyte solution did not occur.

Various embodiments of the invention have been described. These and other embodiments are within the scope of the following claims.

The invention claimed is:

1. A battery comprising:
  a bipolar electrode stack comprising:
    a collector,
    a cathode electrically connected to a first side of the collector,
    an anode electrically connected to a second side of the collector, and
  one or more layers of electrolyte overlaying the cathode and anode, wherein the collector comprises a high-polymer material containing a plurality of electrically conductive particles, wherein the cathode and anode directly contact at least a portion of a surface of the high-polymer material of the collector, and wherein the plurality of electrically conductive particles comprises a first and second type of electrically conductive particles, wherein the first type contacts the cathode and the second type contacts the anode.

2. The battery of claim 1, wherein the electrically conductive particles are metal particles or carbon particles.

3. The battery of claim 1, wherein the electrically conductive polymer comprises one or more of poly aniline, polypyrrole, polythiophene, polyacetylene, polyparaphenylene, poly(phenylene)vinylene, polyacrylonitrile, and polyoxadiazole.

4. The battery of claim 1, wherein the high-polymer material exhibits a weight average molecular weight of from about 50,000 Daltons to about 1 million Daltons.

5. The battery of claim 1, further comprising an electrode extracting plate electrically connected to a side of the collector.

6. The battery of claim 5, wherein the electrode extracting plate comprises a metal foil.

7. A battery module comprising:
a plurality of electrically connected bipolar electrode stacks, wherein each of the bipolar electrode stacks comprises a collector, a cathode electrically connected to a first side of the collector, an anode electrically connected to a second side of the collector, and one or more layers of electrolyte overlaying the cathode and anode; wherein the collector of each of the bipolar electrode stacks comprises a high-polymer material containing a plurality of electrically conductive particles, wherein the cathode and anode directly contact at least a portion of the high-polymer material of the collector, and wherein the plurality of electrically conductive particles comprises a first and second type of electrically conductive particles, wherein the first type contacts the cathode and the second type contacts the anode.

8. A battery module according to claim 7, wherein the battery module is mounted on or within a vehicle.

9. The battery of claim 1, wherein the high-polymer material comprises one of polyethylene terephthalate, polyimide and polyamide.

10. The battery module of claim 7, wherein the high-polymer material comprises one of polyethylene terephthalate, polyimide and polyamide.

* * * * *